(12) United States Patent
Beaugrand et al.

(10) Patent No.: US 11,311,913 B2
(45) Date of Patent: Apr. 26, 2022

(54) INSTALLATION FOR SORTING ARTICLES SUCH AS PARCELS OR PACKETS WITH A SYSTEM FOR MONITORING THE POSITIONING OF THE ARTICLES BY OUTLINE DETECTION

(71) Applicant: SOLYSTIC, Bagneux (FR)

(72) Inventors: Wilfrid Beaugrand, Valence (FR); Jean-Michel Reboul, Saint Donat (FR)

(73) Assignee: SOLYSTIC, Bagneux (FR)

( * ) Notice: Subject to any disclaimer, the term of this patent is extended or adjusted under 35 U.S.C. 154(b) by 0 days.

(21) Appl. No.: 17/082,457

(22) Filed: Oct. 28, 2020

(65) Prior Publication Data

US 2021/0162465 A1 Jun. 3, 2021

(30) Foreign Application Priority Data

Nov. 28, 2019 (FR) ...................................... 1913365

(51) Int. Cl.
*B07C 3/08* (2006.01)
*B07C 3/14* (2006.01)

(52) U.S. Cl.
CPC . *B07C 3/08* (2013.01); *B07C 3/14* (2013.01)

(58) Field of Classification Search
CPC .. B07C 3/08; B07C 3/082; B07C 3/14; B65G 47/844; B65G 47/845; B65G 2201/0285; B65G 2203/0233
See application file for complete search history.

(56) References Cited

U.S. PATENT DOCUMENTS

| 6,513,641 | B1 * | 2/2003 | Affaticati | B07C 5/36 |
| | | | | 198/357 |
| 10,696,503 | B2 * | 6/2020 | Porat | B65G 17/345 |
| 2016/0001978 | A1 * | 1/2016 | Ragan | B65G 47/844 |
| | | | | 198/370.02 |

FOREIGN PATENT DOCUMENTS

| JP | H06-255742 A | 9/1994 |
| JP | 2002068467 A | 3/2002 |
| WO | 2015/145000 A1 | 10/2015 |
| WO | 2016/010766 A1 | 1/2016 |

OTHER PUBLICATIONS

French Search Report dated Jul. 14, 2020 issued by INPI from corresponding Application No. FR 1913365, 2 pages.

\* cited by examiner

*Primary Examiner* — Michael McCullough
*Assistant Examiner* — Jessica L Burkman
(74) *Attorney, Agent, or Firm* — Ware, Fressola, Maguire & Barber LLP

(57) ABSTRACT

An installation for sorting articles comprises a carousel sorting conveyor having transport bins, an article feed magazine in which articles stored loosely are put into series and then injected one-by-one into the transport bins of the conveyor by an injection device, and a monitoring and control unit that acts on the bins so as to open each of them over a receptacle that corresponds to a delivery address of the article, the injection device comprising piston pushers and a system of sensors being provided to generate data representative of an outline of the article seen in plan so as to enable the data processing unit to detect inappropriate positioning of the article before it is injected into a bin, and, in such a situation, direct the improperly positioned article towards a reject receptacle.

16 Claims, 4 Drawing Sheets

INSTALLATION FOR SORTING ARTICLES SUCH AS PARCELS OR PACKETS WITH A SYSTEM FOR MONITORING THE POSITIONING OF THE ARTICLES BY OUTLINE DETECTION

CROSS REFERENCE TO RELATED APPLICATION

This application claims priority under 35 USC § 119 to French Patent Application No. 1913365 filed on Nov. 28, 2019, which is hereby incorporated by reference in its entirety.

TECHNICAL FIELD

The present invention relates to an installation for sorting articles such as parcels or packets, such as small postal parcels, which installation comprises a carousel sorting conveyor having transport bins for transporting the articles that are moved around a closed loop in a certain movement direction over a plurality of sorting outlets formed by respective storage receptacles, an article feed magazine in which articles stored loosely (bulk storing) are put into series and then injected one-by-one into the transport bins of the conveyor as it is moving by an injection device, and a monitoring and control unit that acts on the sorting conveyor so as to empty each bin containing an article over a receptacle that corresponds to a delivery address of the article following a sorting plan stored in a memory in the monitoring and control unit.

For example, the present invention is applicable to an installation for sorting parcels or packets in a plurality of sorting passes, and more particularly in two sorting passes, into a large number of directions or destinations. The large number of directions or destinations is of the order of several thousand.

Such directions or destinations correspond to the various delivery rounds or "postman's walks" for delivering the postal parcels or packets for a country or for a region in a country.

PRIOR ART

For example, parcel sorting can currently take place in a manner such as to be distributed over a plurality of sorting centers, namely, for example, over a main center at which parcels arrive in a country and at which outward sorting is performed, and delivery centers in various regions of the country and at which inward sorting is performed.

The problem with current parcel sorting installations is that the parcels are not really sorted into an order making it possible to organize a delivery round or the parcel sorting must then be honed manually.

Such current installations do not have automation that is sufficiently advanced to perform outward and inward sorting on a single site for small international parcels or "international small packets".

An object of the invention is to make a parcel or packet sorting installation more effective by enabling it to sort parcels or packets in one or more passes into a large number of sorting outlets and therefore into a large number of directions.

Another object of the invention is to improve the throughput rate of such an installation for sorting parcels or packets, and to do so for a broad spectrum of parcels or packets.

For example, the throughput rate aimed for by the invention is of the order of 11,000 or more postal parcels or packets per hour, and the spectrum of the articles handled and processed covers parcels with length, width and height dimensions ranging, for example, from 50 millimeters (mm)×50 mm×5 mm to 400 mm×300 mm×200 mm.

Document WO 2015/145000 discloses an example of an installation for sorting articles.

SUMMARY OF THE INVENTION

To this end the invention provides an installation for sorting articles, the installation comprising a carousel sorting conveyor having transport bins for transporting the articles that are moved around a closed loop in a certain movement direction over a plurality of sorting outlets formed by respective storage receptacles, an article feed magazine in which articles stored loosely are put into series and then injected one-by-one into the transport bins of the conveyor as it is moving by an injection device, and a monitoring and control unit that acts on the sorting conveyor to empty each bin containing an article over a receptacle that corresponds to a delivery address of the article following a sorting plan stored in a memory in the monitoring and control unit, said installation being characterized in that the injection device comprises piston pushers mounted to move on a slat conveyor to be moved both in said certain movement direction and transversely to said certain movement direction so as to inject an article laterally into a bin, and in that a system of sensors is also provided over the piston pushers to generate data representative of an outline of the article seen in plan, and in that the monitoring and control unit is arranged to detect inappropriate positioning of the article relative to the piston pushers on the basis of that outline data, and, in response to such detection, to cause the injection device to direct the improperly positioned article towards a reject outlet receptacle.

Such monitoring of the positioning of the articles by outline detection performed by means of optoelectronic sensors in accordance with the invention makes it possible to inject the articles transversely into the bins, at a high rate and with high reliability.

This installation may further have the following features:

the sensors are optoelectronic sensors forming a vertical detection curtain;

on the basis of the outline data, the data processing unit determines an upstream end instantaneous point, a downstream end instantaneous point, and a pivot instantaneous point of the article, and on the basis of said instantaneous points, computes, by extrapolation, a predictable relative positioning of the article under the effect of it being moved by the piston pushers, and, on the basis of the computed predictable relative positioning, detects whether the article is positioned inappropriately;

the system of sensors may further comprise sensors disposed to generate monitoring data for monitoring the positioning of the article in the certain movement direction relative to the piston pusher in charge of injecting the article into a bin;

each of the bins of the sorting conveyor has a retractable edge strip at the rear, and the injection device is arranged to inject each article laterally over a lateral side of the bin; and the articles are postal parcels or packets such as international small packets.

The invention is described below in more detail and is illustrated by the drawings that show an example of an installation for sorting postal parcels or packets.

DESCRIPTION OF THE EMBODIMENTS

Figure 1:
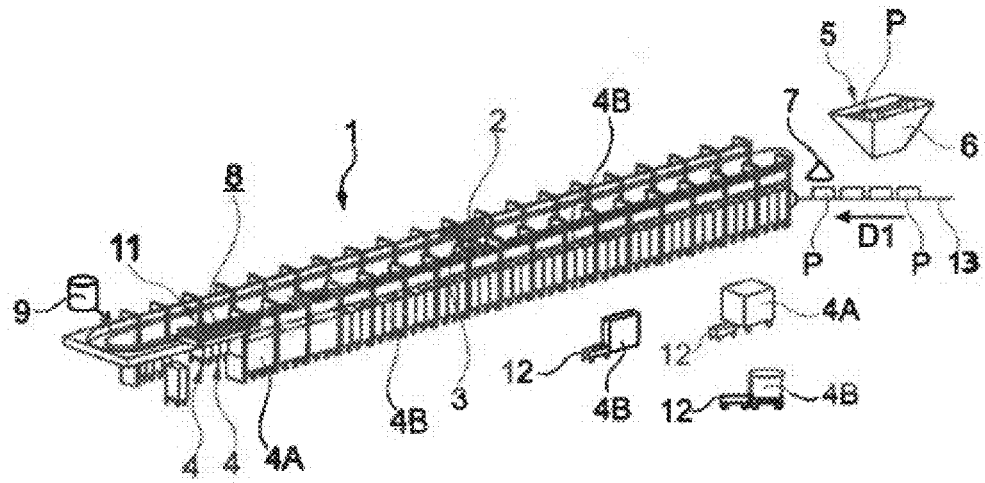
FIG. 1 is a diagrammatic view of a sorting installation of the invention.

FIG. 1 is a diagrammatic view showing an article sorting installation 1 of the invention, in this example for sorting international small packets, each of which is generally rectangular block shaped and has a weight of less than 3 kilograms (kg).

Figure 2:
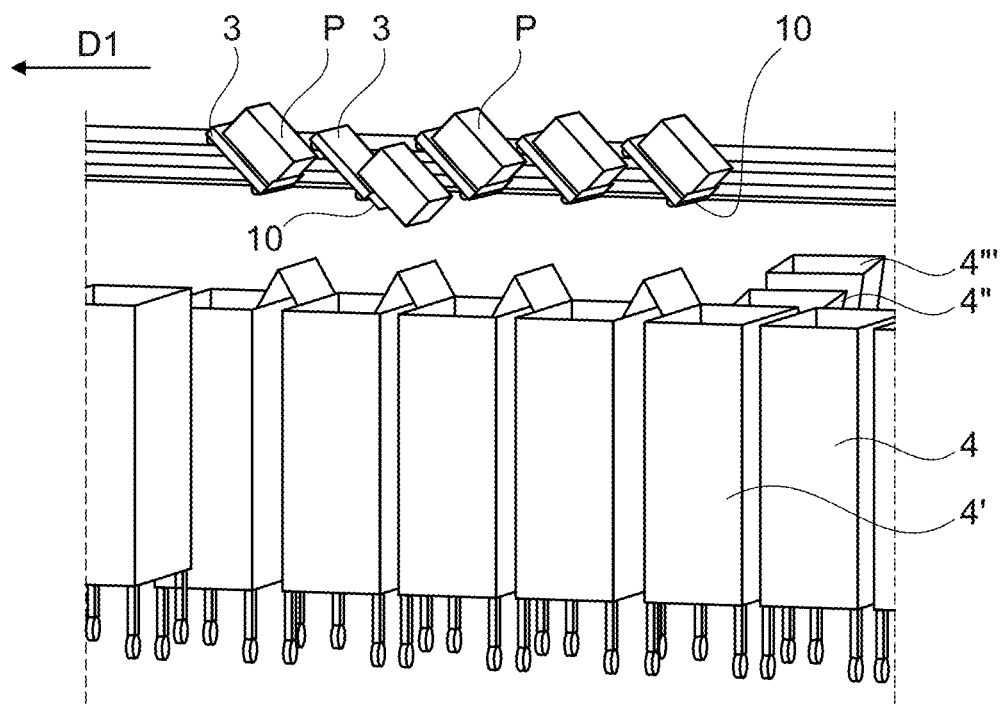
FIG. 2 shows transport bins for transporting the articles with sorting outlet receptacles.

The sorting installation 1 comprises a carousel sorting conveyor 2 having transport bins 3 that are shown highly diagrammatically by each bin being represented by a rectangle in the figures with a retractable edge strip that is more visible in FIG. 2 and that serves to open the bin so as to empty an article, e.g. over a sorting outlet.

Said transport bins 3 are moved while being tilted relative to the horizontal (the retractable edge strip of each tilted bin then being in the raised position) and following a closed loop over a plurality of sorting outlets formed by storage receptacles 4 that are open at their tops and that, in this example, are disposed under two parallel and opposite runs of the loop.

While an article is being transported in a bin in the tilted position with the retractable edge strip of the bin being raised as indicated above, the article that is laid flat in the bin is also in a tilted position and the foot of the article comes into abutment against the raised edge strip of the bin.

Figure 3:
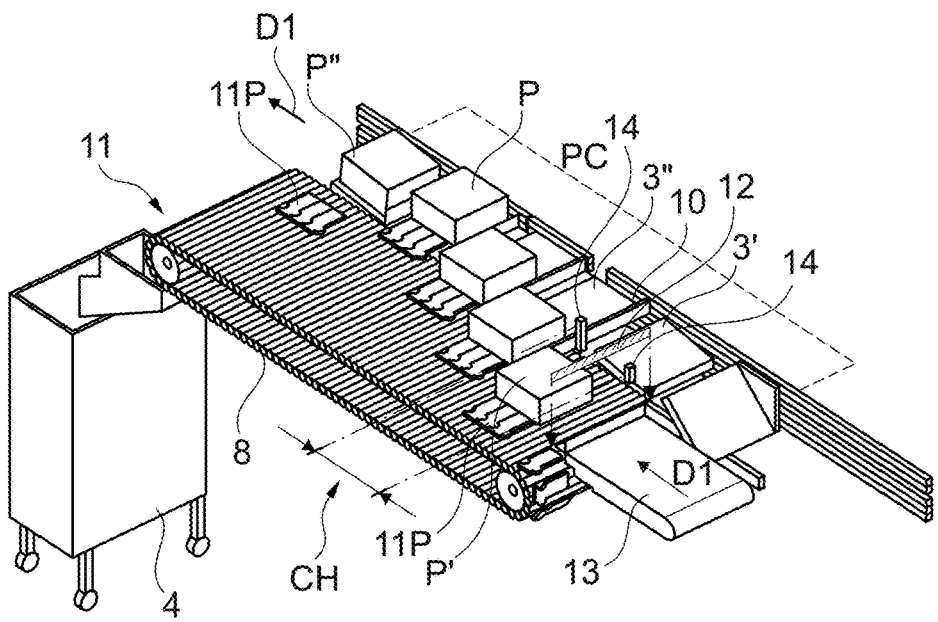
FIG. 3 shows an injector for injecting articles into the transport bins of the sorting conveyor.

The movement direction of the bins is indicated by arrow D1 in FIGS. 2 and 3.

The sorting installation 1 further comprises a parcel feed magazine 5 having a hopper 6 in which the parcels P to be sorted are stored loose.

On exiting from the hopper, the parcels are put into series and aligned, for example, at constant pitch with a view to being injected into the transport bins of the sorting conveyor.

FIG. 1 is a highly diagrammatic view of a device 7 for taking digital images, which device forms an image of each parcel put in series in the magazine 5 and, on the basis of said image, automatically recognizes a distribution or delivery address of the parcel by using Optical Character Recognition (OCR).

The parcels as put in series are conveyed from the feed magazine 5 to an injection device 13 at which the parcels are injected one-by-one into empty transport bins of the sorting conveyor (the injection taking place in this example via a lateral short side of the bin, which is brought up to the horizontal).

On the basis of the address data recognized by the device 7, a monitoring and control unit 9 of the installation shown in FIG. 1 acts on the transport bins of the sorting conveyor so as to empty each bin that contains a parcel (in this example by lowering the edge strip 10 of the bin as shown in FIG. 2) over a receptacle 4 that corresponds to the delivery address of the parcel in a sorting plan stored in a memory in the monitoring and control unit.

When the edge strip 10 of the bin in the downwardly tilted position is lowered, the parcel falls by gravity into the corresponding receptacle situated just below while the bin is moving.

The parcels are conveyed in series from the magazine 5 to the injection device 11, in this example by a conveyor 13 for conveying articles flat, such as a belt conveyor or a roller conveyor, as shown in FIGS. 1 and 3, and that has a system of jogging strips for aligning the parcels one behind the other.

In the example shown in FIG. 1, the conveyor 13 passes under the loop of the sorting conveyor and extends longitudinally between the two opposite parallel runs of the loop of the sorting conveyor, thereby contributing to the compactness of the sorting installation of the invention.

The parcels are injected laterally into the transport bins of the sorting conveyor from the inside of the loop of the sorting conveyor by means of an injection device comprising piston pushers 11P that are shown in FIG. 3.

In this example, these piston pushers 11P are mounted to move between the slats of a slat conveyor 8 so as to be moved by the effect of a cam path disposed under the slats of the slat conveyor both in the movement direction D1 of the bins and of the slats, and also transversely to said direction D1, the effect of this being to move a parcel P taken charge of by a piston pusher 11P from the outside lateral edge of the upstream end of the slat conveyor, as illustrated by parcel P', towards the inside lateral edge of the downstream end of the slat conveyor, as illustrated by parcel P''', from which edge the parcel is fully injected laterally into a transport bin (as brought back up to the horizontal) of the sorting conveyor, which bin is, in this example, positioned adjacent to the piston pusher 11P.

Naturally, the piston pushers with the slats move in direction D1 in a manner synchronized with the movement of the transport bins of the sorting conveyor for the purpose of injecting the parcels one-by-one from the slat conveyor into the bins.

As shown in FIG. 3, the transport bins 3 that are moving around the closed loop over the sorting outlets while being tilted (bin referenced 3' in FIG. 3) are pivoted up into the horizontal position (like bin 3" shown in FIG. 3) at the time at which a parcel is injected into the bin, and the injection therefore takes place by the parcel sliding perpendicularly to the sorting conveyor under the effect of the thrust from the piston pusher.

It can thus be understood that, during the injection, the piston pusher 11P accompanies the parcel while being in mechanical contact with it until the end of insertion of the parcel into the transport bin so that the positioning of the parcel in the transport bin is determined exactly by the path of the piston pusher in the direction transverse to D1.

FIG. 3 also shows a receptacle 4 at the end of the injection device 11, which receptacle serves to recover the parcels P that it has not been possible to inject into the transport bins of the sorting conveyor.

In accordance with the invention, a system of sensors is provided over the piston pushers so as to generate data representative of an outline of the parcel P as seen in plan that is entering the slat conveyor.

On the basis of the outline data, the unit 9 is arranged to detect inappropriate positioning of the parcel P relative to the piston pushers, and in particular relative to the piston pusher 11 that is to take charge of it, i.e., for example, a positioning that does not enable it to be injected into a bin due to misalignment or to improper centering within the pitch between two consecutive parcels on the slat conveyor.

Figure 4:
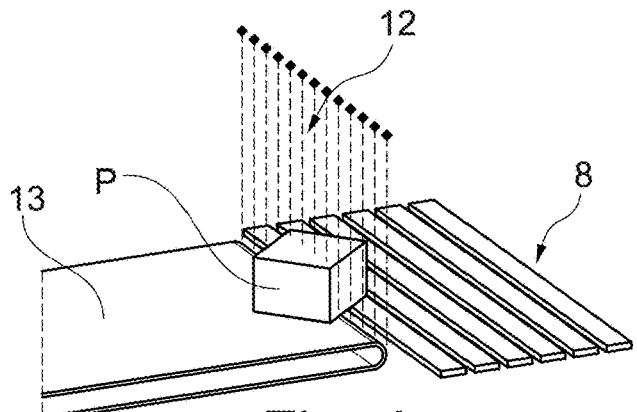
FIG. 4 shows optoelectronic sensors forming a curtain for detecting the outline of an article entering the slat conveyor.

In particular, in accordance with the invention, a system of sensors such as optoelectronic sensors is provided that forms a vertical detection curtain 12 over the parcel P and extending transversely to the slat conveyor, and that overlies the upstream edge of the slat conveyor as shown in FIGS. 3 and 4.

Figure 5:
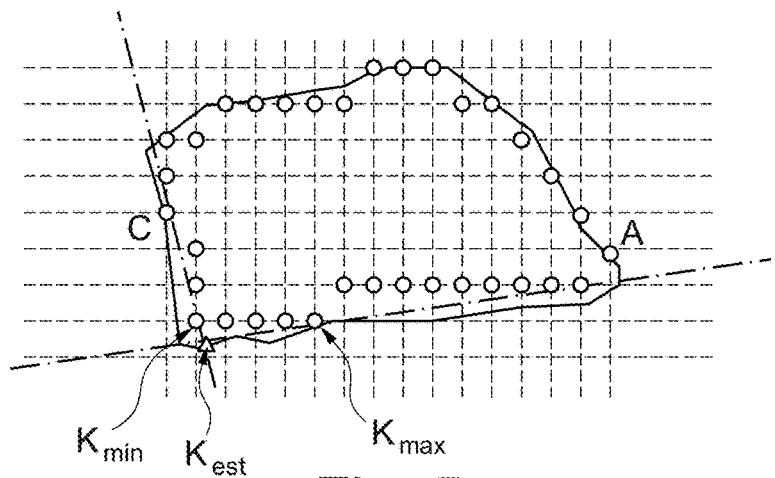
FIG. 5 shows an outline of an article represented by sampling data.
Figure 6:
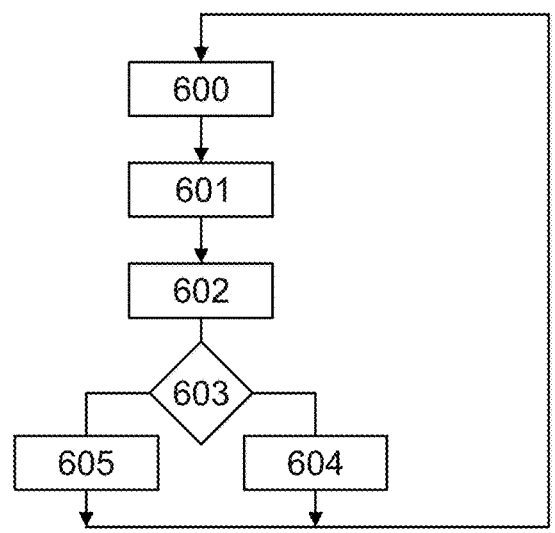
FIG. 6 is a simplified diagram showing the process of detecting the positioning of an article on the slat conveyor in accordance with the invention.

For example, the detection curtain 12 is obtained on the basis of a series of 25 optoelectronic sensors aligned over 500 mm, with an inter-sensor spacing of 20 mm, thereby making it possible to acquire sampling data as illustrated by step 600 in FIG. 6 for parcels within the spectrum aimed at by the invention, said sampling data being representative of the outline of the parcel seen in plan, as shown in FIG. 5, with quite good accuracy.

On the basis of said sampling data, and in step 601 of FIG. 6, the unit 9 estimates the upstream instantaneous end point A of the parcel, the downstream instantaneous end point C of the parcel, and the pivot instantaneous point K of the parcel.

On the basis of these instantaneous points, the unit is capable, by extrapolation by rotation about the estimated pivot point in step 602 of FIG. 6, of computing a predictable relative positioning of the parcel under the effect of it being moved by a piston pusher, and, on the basis of the computed predictable relative positioning, of detecting, in step 603 shown in FIG. 6, whether or not the parcel is positioned appropriately for being injected into a bin.

If the unit 9 detects that the parcel is in an appropriate position, the process of injecting the parcel continues in step 604, i.e. a piston pusher 11 takes charge of the parcel as represented by the parcel P' and brings it by a dual movement to the position for injection into a bin as represented by the parcel P".

Otherwise, i.e. when, in step 603, the unit 9 detects that the parcel is in an inappropriate position, the process continues in step 605 with the parcel being rejected, i.e. with the piston pusher 11 taking charge of the parcel but moving it substantially along the outside lateral edge of the slat conveyor 8 so as to bring it to the receptacle 4 that is situated at the downstream edge of the conveyor 8.

In FIG. 5, $K_{min} \ldots K_{max}$ designate points of the outline of a parcel that have been identified by the unit 9 as being the closest to the piston pusher in charge of parcel, and $K_{est}$ designates the pivot point of the parcel as estimated by the unit 9 on the basis of the points $K_{min} \ldots K_{max}$.

Figure 7:
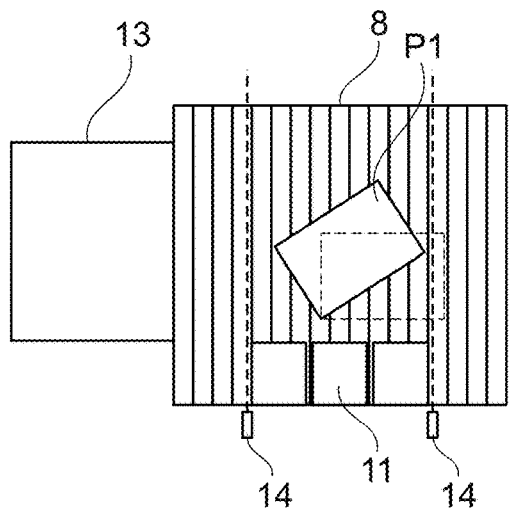
FIG. 7 shows a first example of an article that is improperly positioned for being injected into the transport bins of the sorting conveyor.

In FIG. 7, a first situation is shown in which a parcel P is on the conveyor 8 in a relative positioning that is inappropriate for it being injected into a bin.

In addition, the presence of two horizontal optoelectronic sensors 14 is shown that are disposed on the inside lateral edge of the slat conveyor 8 and that are spaced apart at a distance CH that is slightly larger than the length of a pusher so that it is possible for the unit 9 to detect whether the parcel is situated within the pitch between parcels and, if it is not, to cause the parcel to be rejected into the receptacle 4.

In FIG. 7, the extrapolated relative positioning is shown for the parcel P1 in dashed lines, and it can be seen that said parcel is going to extend beyond the pitch defined between the sensors 14.

Figure 8:
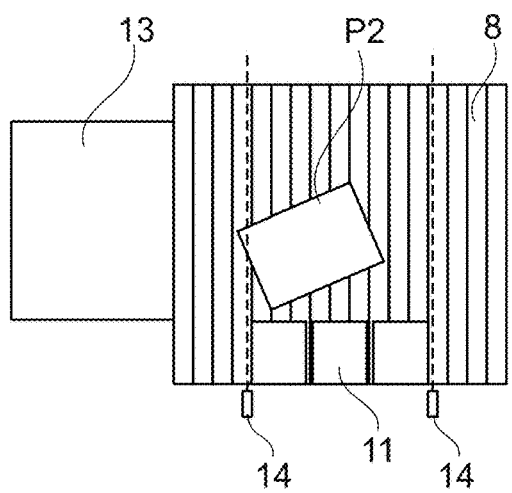
FIG. 8 shows a second example of an article that is improperly positioned for being injected into the transport bins of the sorting conveyor.

In FIG. 8, the extrapolated relative positioning is shown in uninterrupted lines for the parcel P2, and it can be seen that it already extends beyond the pitch defined between the sensors 14.

Figure 9:
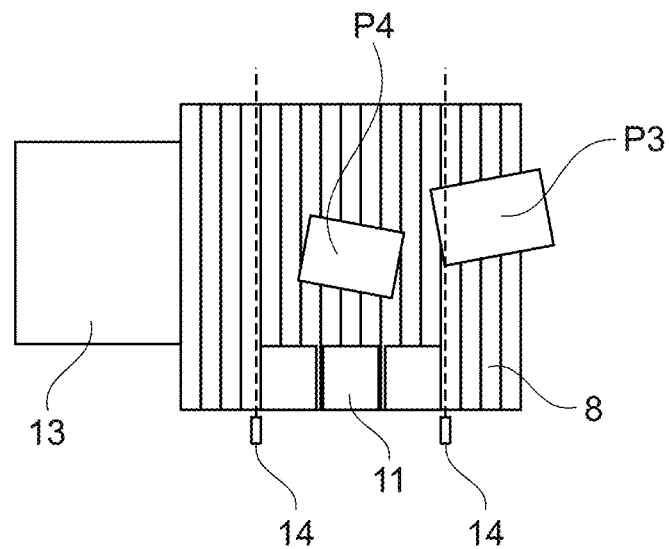
FIG. 9 shows a third example of an article that is improperly positioned for being injected into the transport bins of the sorting conveyor.

In FIG. 9, the extrapolated relative positioning is shown in uninterrupted lines for the parcel P3, and it can be seen that it is too close to the following parcel P4, and is thus not at constant pitch.

Figure 10:
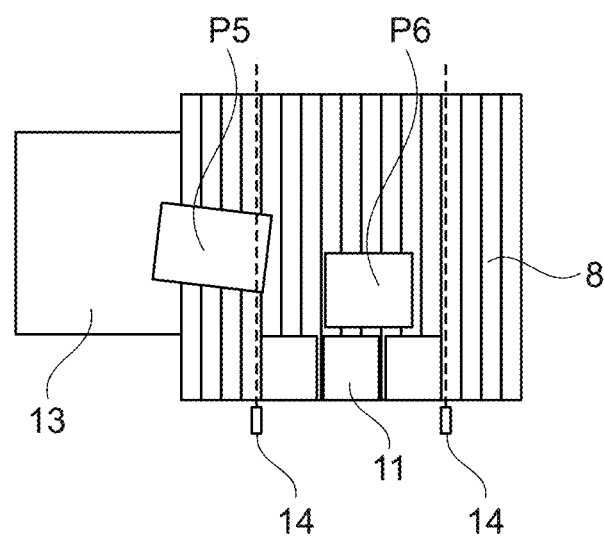
FIG. 10 shows a fourth example of an article that is improperly positioned for being injected into the transport bins of the sorting conveyor.

In FIG. 10, the extrapolated relative positioning is shown in uninterrupted lines for the parcel P5, and it can be seen that it is too close to the preceding parcel P6, and is thus not at constant pitch.

In the installation of the invention, means are provided for aligning the parcels with a constant pitch while the parcels are being put into series on exiting from the hopper 6.

However, the diversity of the parcel shapes means that situations exist in which parcels come into the injection device 11 with improper alignment or improper spacing between parcels.

The system of sensors of the invention thus contributes to reducing the positioning tolerance of the parcels in the injector and to detecting the parcels that are improperly positioned so as to avoid jamming the injector, thereby making it possible to optimize the compactness of the bins and thus of the installation.

In particular, with such a system of sensors of the invention, it is possible to inject parcels that are 400 mm long and 300 mm wide and that are oriented in "landscape mode" into bins that are 400 mm long and 540 mm wide (the width of the bins being transverse to D1) with a pitch between parcels of 495 mm and a piston pusher width of about 370 mm.

The speed of movement of the bins may be of the order of 1.53 meters per second (m/s), thereby making it possible to obtain a sorting throughput rate of greater than 11,000 parcels per hour.

In accordance with the invention, the sorting plan that is run by the monitoring and control unit 9 in the sorting installation 1 may be a multi-pass sorting plan and, in this example, in particular, a sorting plan in two passes.

In this sorting plan in two passes, during the first sorting pass, the parcels P as put in series in the magazine are firstly sorted into first receptacles having high loose storage capacity, i.e., for example, the capacity to store several hundreds of international small packets loose.

In this first sorting pass, the parcels P are separated, e.g. into batches of delivery rounds or "postman's walks".

A receptacle having high loose storage capacity is indicated in FIG. 1 by reference 4A.

A receptacle 4A may, for example, be a container.

At the end of the first sorting pass, the containers filled with parcels sorted in the first pass are moved by shuttle robots 12 to the feed inlet of the installation for being put back into the hopper 5.

Said shuttle robots are controlled by the monitoring and control unit 9 to move, in particular, from a zone in which the shuttle robots are stowed to the sorting outlets of the installation, or indeed from the sorting outlets to the feed magazine of the installation or else to a zone in which empty or full receptacles are stored.

During the second sorting pass, the parcels P are sorted into second sorting outlet receptacles that are of loose storage capacity that is smaller than the loose storage capacity of the receptacles 4A, e.g. a capacity of a few tens of international small packets.

In this second sorting pass, the parcels P are separated, e.g. by delivery round.

A receptacle having low loose storage capacity is indicated in FIG. 1 by reference 4B.

A receptacle 4A may, for example, be a tray or a bag.

The receptacles 4A and 4B are wheeled receptacles or receptacles mounted on wheeled trolleys. The bags are carried by wheeled trolleys in the form of frames from which the bags are hung, the top of the bag being kept open at the top of the frame.

After the second sorting pass, the receptacles 4B as filled with parcels can be grouped together by destination and by time slot for being transported by means of the shuttle robots towards a distribution or delivery depot.

The first sorting pass into receptacles of high loose storage capacity makes it possible to simplify storage and re-feeding the installation, while the second sorting pass into receptacles of lower loose storage capacity makes it possible to adapt the second receptacles to the volume of a delivery round, for example, and the smaller-capacity receptacles may be grouped together in larger containers for being transported by truck.

In this installation 1 and as shown in FIG. 1, it is possible, in the sorting plan, to assign first sorting outlets to first receptacles 4A and second sorting outlets to second receptacles 4B with the first outlets being different from the second outlets in such a manner as to start the second sorting pass before the end of the first sorting pass, and thereby accelerate the sorting process.

In accordance with the invention, the parcel sorting process may include a plurality of successive sorting passes into receptacles 4A and a plurality of sorting passes into receptacles 4B.

In the installation 1 of the invention, a plurality of wheeled receptacles (of the type 4A or 4B) indicated by references 4', 4'' 4''' may be disposed in line to serve the same sorting outlet as shown in FIG. 2, and a system may be provided for moving the line of receptacles under the sorting outlet as the receptacles in line are filled.

This makes it possible to further increase the sorting capacities of the installation of the invention.

With the sorting installation of the invention, it is possible to design mixed sorting outlets that are suitable for receiving both large and small receptacles 4A and 4B.

The number of sorting outlets in the installation depends on the length of the loop of the sorting conveyor and on the size of the receptacles placed under the loop of the sorting conveyor.

Naturally, the monitoring and control unit 9 stores in a memory the topography of the sorting outlets so as to make it possible to perform the sorting into the sorting outlet receptacles.

The batches of delivery rounds sorted in the first pass are, for example, constituted with full shipments, i.e. groups of delivery rounds that are to be grouped together in the same transport containers.

If it is considered that the installation can separate n batches in the first sorting pass and that each batch is separated into m delivery rounds, the total number of delivery rounds that can be separated is given by the expression n×m.

An installation of the invention having 64 mixed sorting outlets makes it possible to separate about 4000 delivery rounds.

It should be noted that this sorting installation of the invention can handle sorting of parcels and packets with, in addition, large-format flat postal articles or "flats".

This sorting installation is very well adapted to replace a conventional sorting installation already installed in a postal sorting center, for example.

The architecture of the sorting installation of the invention makes it possible to achieve high sorting throughput rates with high compactness.

The invention claimed is:

1. An installation for sorting articles, the installation comprising:
    a carousel sorting conveyor having transport bins for transporting the articles that are moved around a closed loop in a certain movement direction over a plurality of sorting outlets formed by respective storage receptacles,
    an article feed magazine in which articles stored loosely are put into series and then injected one-by-one into the transport bins of the conveyor as it is moving by an injection device, and a monitoring and control unit that acts on the sorting conveyor to empty each transport bin containing an article over a receptacle that corresponds to a delivery address of the article following a sorting plan stored in a memory in the monitoring and control unit,
    wherein the injection device comprises piston pushers mounted to move on a slat conveyor to be moved both in said certain movement direction and transversely to said certain movement direction so as to inject an article laterally into one of the transport bins,
    wherein a system of sensors is also provided over the piston pushers to generate data representative of an outline of the article seen in plan,
    wherein the monitoring and control unit is arranged to detect inappropriate positioning of the article relative to the piston pushers on the basis of said data representative of the outline of the article, and, in response to such detection, to cause the injection device to direct the improperly positioned article towards a reject outlet receptacle that is disposed downstream from the slat conveyor.

2. The installation according to claim 1, wherein the sensors are optoelectronic sensors forming a vertical detection curtain.

3. The installation according to claim 1, wherein, on the basis of the outline data, the data processing unit determines an upstream end instantaneous point, a downstream end instantaneous point, and a pivot instantaneous point of the article, and on the basis of said instantaneous points, computes, by extrapolation, a predictable relative positioning of the article under the effect of it being moved by the piston pushers, and, on the basis of the computed predictable relative positioning, detects whether the article is positioned inappropriately.

4. The installation according to claim 1, wherein the system of sensors further comprises sensors disposed to generate monitoring data for monitoring the positioning of the article in said certain movement direction relative to the piston pusher in charge of injecting the article into one of the transport bins.

5. The installation according to claim 1, wherein each of the transport bins of the sorting conveyor has a retractable edge strip at the rear, and the injection device is arranged to inject each article laterally over a lateral side of one of the transport bins.

6. The installation according to claim 1, wherein the sorting conveyor is adapted for sorting postal parcels or packets.

7. The installation according to claim 1, wherein, on the basis of the outline data, the data processing unit determines an upstream end instantaneous point, a downstream end instantaneous point, and a pivot instantaneous point of the article, and on the basis of said instantaneous points, computes, by extrapolation, a predictable relative positioning of the article under the effect of it being moved by the piston pushers, and, on the basis of the computed predictable relative positioning, detects whether the article is positioned inappropriately.

8. The installation according to claim 2, wherein the system of sensors further comprises sensors disposed to generate monitoring data for monitoring the positioning of the article in said certain movement direction relative to the piston pusher in charge of injecting the article into one of the transport bins.

9. The installation according to claim 1, wherein the system of sensors further comprises sensors disposed to generate monitoring data for monitoring the positioning of the article in said certain movement direction relative to the piston pusher in charge of injecting the article into one of the transport bins.

10. The installation according to claim 3, wherein each of the bins of the sorting conveyor has a retractable edge strip at the rear, and the injection device is arranged to inject each article laterally over a lateral side of one of the transport bins.

11. The installation according to claim 2, wherein each of the bins of the sorting conveyor has a retractable edge strip at the rear, and the injection device is arranged to inject each article laterally over a lateral side of one of the transport bins.

12. The installation according to claim 1, wherein each of the bins of the sorting conveyor has a retractable edge strip at the rear, and the injection device is arranged to inject each article laterally over a lateral side of one of the transport bins.

13. The installation according to claim 4, wherein the sorting conveyor is adapted for sorting postal parcels or packets.

14. The installation according to claim 3, wherein the sorting conveyor is adapted for sorting postal parcels or packets.

15. The installation according to claim 2, wherein the sorting conveyor is adapted for sorting postal parcels or packets.

16. The installation according to claim 1, wherein the sorting conveyor is adapted for sorting postal parcels or packets.

* * * * *